Patented Dec. 17, 1935

2,024,355

UNITED STATES PATENT OFFICE 2,024,355

MARGARINE AND METHOD OF MAKING SAME

Benjamin R. Harris, Chicago, Ill.

No Drawing. Application August 14, 1933, Serial No. 685,081

14 Claims. (Cl. 99—13)

My invention relates in general to the manufacture of oleomargarine.

Oleomargarine is manufactured by forming an emulsion of oleaginous material and aqueous material wherein the oleaginous material constitutes the continuous phase and the aqueous material the dispersed phase. In ordinary margarine, the aqueous material is milk. Until recent years, all margarine suffered in this respect, that the aqueous material was not sufficiently bound in the margarine to prevent its leaking out during transportation, storage and use of the product. In my prior Patent No. 1,917,254, I disclosed a method of treating margarine to prevent this leaking or "weeping" and secure other advantages in spreading value, texture, and the like. Those skilled in the art are referred to this prior patent for a more complete discussion of the problems involved, details of the manufacture of margarine, and the like.

An object of my present invention is the provision of a new method for securing substantially the same results obtainable by the process and materials disclosed in my prior patent.

Another object is the provision of a new material adapted to be used in margarine to improve the same.

Another object is the provision of an improved margarine.

Other objects and features of the invention will be noted from the following detailed description.

By means of the invention herein described, a margarine is produced having a reduced tendency to leak and possessing improvements in spreading characteristics, texture, and in other respects. The class of materials which I employ are tri-glycerides modified so as to impart thereto properties for influencing the margarine. The effect on the margarine is perceptible, even with additions as small as .1% to .2%, but in practice I prefer to incorporate from .5% to 1.5% of the modified fat. Larger amounts may be used, however, if desired. While the materials of my present invention appear to play a wetting and emulsifying role and function in other ways to improve margarine, they do not to any noticeable extent possess the power to prevent the spattering of margarine in the way that materials do of the kind described in my prior Patents Numbered 1,917,249; 1,917,250; 1,917,251; 1,917,252; 1,917,255; 1,917,256; 1,917,257; 1,917,258; 1,917,259 and 1,917,260.

In general, my method for preparing my modified fat is to partially saponify a tri-glyceride with an alkaline saponifying agent, the quantity of alkali used being insufficient by far to completely saponify the tri-glyceride. The soap constituent produced as a result of this saponification is then decomposed either in whole or in part by means of hydrochloric, phosphoric, tartaric, lactic, citric, or some other innocuous acid. I prefer to form a paste of the mixture resulting from the partial saponification of the tri-glyceride, using about equal parts by weight of the mixture and water. This paste is then treated with the acid to decompose the soap. Whether a paste is formed before or after the soap is decomposed, the product resulting from the process is preferably made available in paste form to be incorporated into the margarine. The manner of its incorporation will be treated of hereinafter.

As a guide to those skilled in the art, I give below several illustrative embodiments of the invention:

Example No. 1

500 parts of hydrogenated cottonseed oil (melting point 140° F.) are melted and kept at a temperature of 220° C. To this is added, with stirring, a mixture of 12½ parts of caustic soda and 17½ parts of caustic potash, also melted and kept at 220° C. Vigorous stirring is continued for ten minutes.

This molten mixture is then cooled to about 170° C. and poured gradually, with stirring, into 500 parts of water at 70° C. The paste is then cooled down to about 40° C., when 47.5 parts of "concentrated" hydrochloric acid, diluted with 90 parts of water, are stirred in. The resultant product is a paste which lends itself readily to incorporation with oleomargine in a margarine blender.

Example No. 2

400 parts of oleostearine are melted, heated and kept at 200° C. To this melt are added, with vigorous stirring, 20 parts of caustic soda dissolved in 30 parts of water. The caustic soda solution is added very slowly at first so as to keep the foaming down to a minimum. As the foam gradually subsides, more caustic soda solution is added. During the addition of the caustic solution, the temperature of the oleostearine drops to about 180° and is maintained at this temperature by supplying sufficient heat to the melt.

After all of the caustic soda is in, the stirring is continued for an additional five to ten minutes. This melt is then run, with agitation, into 400 parts of water at 75° C. This mixture is then heated and simultaneously stirred until a smoothly dispersed product is obtained. This is cooled down to 50° C. and 130 parts of 28% lactic acid are stirred in.

The product is a homogeneous paste with marked water-imbibing properties and readily blendable with margarine.

*Example No. 3*

300 parts of cottonseed stearine (iodine number not over 90) are melted by heating to 175° C. and treated with 15 parts of caustic soda dissolved in 65 parts of glycerol, and heated to the same temperature. The glycerol-soda solution is added gradually with stirring and heat control so that a temperature of approximately 175° is maintained throughout. There is some foaming but not very much.

After all the glycerol-soda is in, the heating and stirring are continued for an additional 5 minutes. This mixture is then run into 300 parts of water kept at 70° C. and stirring is continued until a smoothly dispersed paste is obtained and the temperature has dropped to about 45° C. Finally, into this paste are mixed 62 parts of aqueous hydrochloric acid, 20% strength.

As shown in the above illustrative examples, I prepare my modified tri-glyceride by partially saponifying a tri-glycerine, preferably one which is solid at room temperature, such as one of the tri-glycerides given in the examples, or tallow or the like, with a liquid alkali mixture. I then transform the modified fat into a paste with water, and finally decompose the greater part of the soap formed in the saponification process by the introduction of an innocuous acid. The materials produced preferably used in paste form have the unique property of reducing the leakiness of oleomargarine and at the same time improving the texture and spreading characteristics of the margarine.

It will be understood that the proportions of alkali used may be modified greatly, while still employing less alkali than the amount which would completely saponify the tri-glyceride. The amount of alkali used will, of course, determine the amount of unchanged tri-glyceride which will appear in the ultimate product. The proportion of acid also may be varied a great deal, depending upon the degree of alkalinity or whether substantial neutrality is desired in the finished product. Slight alkalinity appears to be conducive to smoothness in the paste. For most purposes, I prefer to use an amount of acid which represents substantially 75 to 90% of the chemical equivalent of the alkali employed. I have discovered that in general the smoothness of the finished product, other things being equal, is an inverse function of the proportion of acid used. In other words, if the amount of acid used is relatively small, the paste will be smoother and the water imbibing properties will be more pronounced. It should be noted that in general the smaller the proportion of alkali and the proportion of acid used, the lower will be the content of free fatty acid in the finished paste.

In my preferred treatment for oleomargarine, I place a suitable quantity, for example 250 pounds of oleomargarine, in a conventional blender, maintaining it at a temperature at which it is in a suitably plastic condition for blending. This temperature will, of course, vary with the composition of the margarine. When treating the conventional coconut margarine, a temperature of 60 to 62° C. is satisfactory. I then take 4 pounds of the paste, previously formed and including approximately 50% of water, and dilute it with 8 pounds of sweet or ripened milk. The diluted paste is then added to the blender and the blending operation continued until the margarine has taken up all of the liquid in the blender and it appears dry and free from loose moisture. Usually the time required is from two to four minutes, although this time also may have to be modified somewhat under different conditions. The completed margarine, after being removed from the blender, may then be handled in any of the customary ways. For example, it may be printed and packed immediately, or may be allowed to set for any convenient length of time in accordance with the routine treatment in a margarine establishment.

If it is desired to diminish the content of water-soluble materials in my modified fats, the pastes, prior to acidification, are dispersed in a large proportion, approximately four times their own weight of water, at a temperature of 90° C. or higher and are then salted out by dissolving in this dispersion sufficient salt, preferably sodium chloride, to give a concentration of approximately 6% to 10% in the water. The proportion of salt required varies with the character of the modified fat and must be sufficient to throw out the modified fat product as a supernatant layer when the hot, salted dispersion is allowed to remain at rest. The brine is drained out from under the supernatant layer which comprises the modified fat product and imbibed water. The supernatant layer is then stirred to a paste and to a desired temperature and treated with acid, water, or otherwise.

I have described my invention in detail to permit those skilled in the art to practice the same, but my invention is limited only by the scope of the appended claims.

What I claim as new and desire to protect by Letters Patent of the United States is:

1. The method of treating margarine containing oleaginous and aqueous materials, which comprises incorporating therewith a material formed by partially saponifying a tri-glyceride, and partially decreasing the proportion of soap formed as a result of said saponification.

2. The method of treating margarine containing oleaginous and aqueous materials which comprises blending into the margarine while in plastic condition a proportion of a material formed by partially saponifying a tri-glyceride, and partially decreasing the proportion of soap formed as a result of said saponification.

3. The method of forming an improved margarine which comprises forming a plastic margarine emulsion of oleaginous and aqueous materials, partially saponifying a tri-glyceride, mixing the resulting product with water to form a paste, adding an innocuous acid to the paste to partially decrease the proportion of soap formed by the partial saponification, and blending the resulting material into the pastic margarine.

4. The method of forming an improved margarine which comprises forming a plastic margarine emulsion of oleaginous and aqueous materials, partially saponifying a tri-glyceride to form a mixture including a proportion of soap, adding an acid to the mixture to partially decrease the proportion of soap, forming a paste of the resulting material, and blending the paste into the plastic margarine.

5. The method of forming an improved margarine which comprises forming a plastic margarine emulsion of oleaginous and aqueous materials, partially saponifying a tri-glyceride to form a mixture including a proportion of soap, adding an acid to the mixture to partially decrease the proportion of soap, forming a paste of the resulting material, diluting the paste with a proportion of milk, and blending the paste into the plastic margarine.

6. The method of forming an improved margarine which comprises forming a plastic margarine emulsion of oleaginous and aqueous materials, partially saponifying a tri-glyceride, mixing the resulting product with water to form a paste, adding an innocuous acid to the paste to partially decrease the proportion of soap formed by the partial saponification, diluting the paste with a proportion of milk, and blending the resulting diluted paste into the plastic margarine.

7. An improved margarine comprising an emulsion of oleaginous and aqueous material having included therein a proportion of a hydrophillic material containing a proportion of higher fatty acid glycerine with unesterified OH groups formed by partially saponifying a tri-glyceride, and partially decreasing the proportion of soap formed as a result of said saponification.

8. An improved margarine comprising an emulsion of oleaginous and aqueous material having included therein a proportion of a hydrophillic material containing a proportion of higher fatty acid glycerides with unesterified OH groups formed by partially saponifying a tri-glyceride, and mixing the resulting product with an acid to partially decrease the proportion of soap formed as a result of the saponification.

9. The method of improving margarine, which comprises partially saponifying a tri-glyceride, treating the resulting mixture to partially decrease the amount of soap therein, and blending the resulting product into the margarine while in a plastic condition.

10. The method of improving margarine which comprises partially saponifying a tri-glyceride, incorporating a proportion of acid in the resulting mixture to neutralize a part of the soap therein, and blending the resulting product into the margarine while in a plastic condition.

11. The method of improving margarine which comprises partially saponifying a tri-glyceride, incorporating a proportion of acid in the resulting mixture to neutralize a part of the soap therein, forming a paste of the resulting product, and blending the paste into the margarine.

12. The method of producing a material adapted to be blended into plastic margarine to prevent weeping thereof, which comprises partially saponifying an oleaginous material, incorporating water in the partially saponified product to form a paste, and partially neutralizing said product while maintaining the same in paste form.

13. The method of producing an improved margarine which comprises partially saponifying an oleaginous material, incorporating an aqueous liquid in the partially saponified product at a relatively high temperature to form a paste, partially neutralizing said product while maintaining the same in paste form, and working the resulting paste into the margarine while in a plastic condition whereby to prevent weeping thereof.

14. An improved margarine comprising a plastice emulsion of oleaginous and aqueous materials and having included therein a relatively small amount of a hydrophillic product containing a proportion of higher fatty acid glycerides with unesterfied OH groups formed by partially saponifying a tri-glyceride, and then partially neutralizing the saponified product.

BENJAMIN R. HARRIS.